Sept. 10, 1963     H. F. JOHN ETAL     3,103,455

DENDRITES AND PROCESS FOR PRODUCING THE SAME

Filed May 18, 1960     3 Sheets-Sheet 1

INVENTORS
Harold F. John &
John W. Faust, Jr.
BY
*Frederick Shapoe*
ATTORNEY

Sept. 10, 1963      H. F. JOHN ETAL      3,103,455
DENDRITES AND PROCESS FOR PRODUCING THE SAME
Filed May 18, 1960      3 Sheets-Sheet 3

3,103,455
DENDRITES AND PROCESS FOR PRODUCING THE SAME
Harold F. John, Pittsburgh, and John W. Faust, Jr., Forest Hills, Pa., assignors to Westinghouse Electric Corporation, East Pittsburgh, Pa., a corporation of Pennsylvania
Filed May 18, 1960, Ser. No. 29,921
6 Claims. (Cl. 148—33)

This invention relates to a process for producing doped dendrite crystals of solid semiconductor materials, and in particular to the growing of semiconductor dendrites with multiple doped zones therein.

At the present time, crystals of many solid materials are produced by preparing a melt of the solid material, contacting the surface of the melt with a previously prepared crystal of the material and slowly withdrawing the previously prepared crystal. Usually the rate of withdrawal is of the order of an inch an hour, to produce a desired grown crystal member. It has been the invariable practice in such a process in the past to maintain the melt, during crystal growing, at a temperature slightly above the melting point of the solid material.

The nature and configuration of the withdrawn crystals produced by such prior art practices have generally been uncontrollable except within relatively broad limits. Thus, the thickness has not been readily maintained within a precise dimension. In many cases, surface and internal imperfections such as dislocations and other crystal structure flaws have been present in the grown crystals.

In the semiconductor industry, crystals of silicon, germanium and compounds of the group III–group V elements of the periodic table have been grown from melts in accordance with this prior art practice. In order to employ such grown crystals in semiconductor devices, it has been necessary to saw them into slices using, for example, diamond saws. Thereafter, dice of the desired shape have been cut from these slices. The sawed surfaces of the dice are lapped or otherwise mechanically polished to remove disturbed or otherwise unsatisfactory surface layers, which treatment is followed by an etch to remove microscopic surface imperfections. As a result of this working, which is performed on expensive precise machinery and requires highly-skilled labor, there may be a loss of as much as 90% of the original grown crystals in securing dice that have satisfactory shape and configuration for semiconductor applications. In addition, the loss from processing of the dice is increased by errors and mistakes in the doping of the dice, by the alloy fusion method, the vapor diffusion method, or any other method known to those skilled in the art to form selected zones of p- or n-type semiconductivity.

An object of the present invention is to provide a dendritic crystal of a semiconductor material comprising at least three zones of two different types of semiconductivity.

Another object of the present invention is to provide a dendritic crystal of a semiconductor material comprising at least three zones of two alternating types of semiconductivity wherein one zone comprises a central region of the dendrite and two other zones are disposed one on each side of the central region.

Still another object of the present invention is to provide a dendritic crystal of a semiconductor material comprising at least five zones of two alternating types of semiconductivity, wherein one zone comprises an H-shaped cross section in which the legs and crossbar of the H form zones of one type of semiconductivity, the area between the legs of the H form zones of a second type of semiconductivity, and two outer zones of the second type of semiconductivity disposed on the outside of the legs of the H.

An object of the present invention is to provide a process for producing selectively doped dendritic crystals containing at least three regions of alternating semiconductivity which have a desired thickness from a supercooled melt comprised of a semiconductor material and at least one p-type and at least one n-type doping material, the segregation coefficients and concentration of which in the melt are correlated.

Another object of the present invention is to provide a process for producing flat selectively doped dendritic crystals of solid materials having therein at least two p-n junctions by preparing a melt of a semiconductor material and at least one p-type and at least one n-type doping material, the doping materials being present in the melt in suitable concentrations, supercooling the melt and thereafter withdrawing dendritic crystals containing doping impurities in the desired proportions in selected regions from the melt.

Another object of the invention is to provide a semiconductor device comprising a portion of a dendritic crystal which comprises at least three grown zones of two different types of conductivity and at least two contacts affixed to different zones.

Other objects of the invention will, in part, be obvious and will, in part, appear hereinafter.

For a better understanding of the nature and objects of the invention, reference should be had to the following detailed description and drawing, in which.

Figure 1:
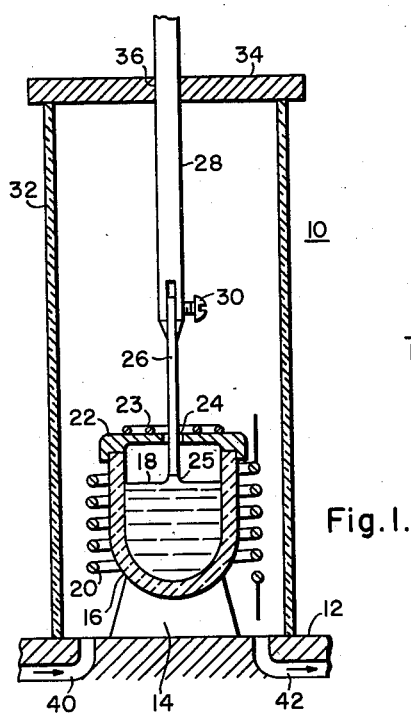
FIGURE 1 is a view in elevation partly in section of a crystal growing apparatus suitable for use in accordance with this invention.

In accordance with the present invention, it has been discovered that selectively doped crystals of solid materials having desired p-n junctions may be prepared as flat dendritic crystals having a closely controlled thickness and relatively precise flat parallel faces. These selectively doped flat dendritic crystals may be pulled or grown from doped melts of the material at a relatively high rate of speed of pulling of the order of 100 times and greater than the linear pulling velocity previously employed in the art. The thickness of the crystals and impurity carrier concentration may be readily controlled and surface imperfections minimized or reduced by following the teachings of the present invention.

More particularly, in practicing the process, a melt comprised of the material to be grown into a flat dendritic crystal and selected doping materials, is prepared at a temperature slightly above the melting temperature thereof. The surface of the melt is contacted with a previously prepared crystal having a plurality of parallel twin planes, for example, three twin planes, at the interior thereof, the crystal being oriented in the <211> direction vertical to the melt surface and with the vertices of etch pits in the crystal surfaces and the twin planes of the seed being directed in the direction of pulling. Other necessary or desirable crystallographic and physical features of the seed crystal will be discussed in detail hereinafter. The seed crystal is brought into wetting contact with the melt, as by being dipped into the surface of the melt a sufficient period of time to cause wetting of the lower surface of the seed, usually a period of time of a few seconds is adequate, and, then, the melt is supercooled rapidly, following which the wetted seed crystal is withdrawn with respect to the melt at a speed of the order of from 1 to 20 inches a minute. Under some conditions, considerably slower pulling speeds than an inch per minute can be employed, for example, 0.2 inch per minute. Pulling speeds of from 4 to 10 inches per minute have given good results. The degree of supercooling and the rate of pulling of the seed crystal from the melt can be so correlated as to produce a thin strip of solidified melt material having a precise desired thickness and carrier concentration and having the desired crystallographic orientation.

The present invention is particularly applicable to solid materials crystallizing in the diamond cubic lattice structure. Examples of such materials are the elements silicon and germanium. Likewise, stoichiometric compounds having an average of four valence electrons per atom respond satisfactorily to the crystal growing process. Such compounds which may be processed with excellent results comprise substantially equal molar proportions of an element of group III of the periodic table, particularly aluminum, gallium and indium, combined with an element of group V, of the periodic table, particularly phosphorous, arsenic and antimony. Compounds comprising stoichiometric proportions of group II and group VI elements, for example, zinc selenide and zinc sulphide, can be processed. These materials crystallizing in the diamond cubic lattice structure are particularly satisfactory for various semiconductor applications.

The dendrite of semiconductor material produced in accordance with the teachings of this invention comprises an elongated body having two substantially parallel flat faces of {111} orientation extending in the lengthwise direction. When cut transversely and etched, a suitable dendrite will exhibit two substantially symmetrical portions disposed about a plane perpendicular to the faces and extending midway of the edges along the lengthwise direction of the dendrite. Each symmetrical portion comprises two legs extending laterally from the perpendicular plane, a crossbar connecting the legs at the plane, an area between the legs extending laterally from the crossbar to the outside edge, and a flat layer grown along the outside surface of each leg. When prepared in accordance with one procedure of this invention in which the melt is properly doped with p- and n-type impurities, the legs and crossbar will be of one type of semiconductivity and both the area between the legs and the outside flat layers will be of a second-type of semiconductivity. When prepared in accordance with a second procedure of this invention, the legs, crossbar and area between the legs will all be of a first type of semiconductivity and the outside flat layers will be of a second-type of semiconductivity.

For a better understanding of the practice of the invention, reference should be had to FIG. 1 of the drawing wherein there is illustrated apparatus 10 for practicing the process of this invention. The apparatus comprises a base 12 carrying a support 14 for a crucible 16 of a suitable refractory material, such as graphite, to hold a melt 18 comprised of a material from which the flat dendritic crystals are to be drawn and suitable p- and n-type doping materials in predetermined proportions. The melt 18, which comprises a semiconductor material, for example, germanium, and an n-type doping material, for example, antimony, and a p-type doping material, for example, boron, both doping materials being present in selected proportions, is maintained within the crucible 16 in the molten state by a suitable heating means, for example, a first induction heating coil 20 disposed about the crucible. Controls, not shown, are employed to supply an alternating electrical current to the induction coil 20 to maintain a closely controllable temperature in the body of the melt 18. The temperature should be readily controllable to provide a temperature in the melt a few degrees above the melting point and also to reduce heat input so that the temperature drops in a few seconds, for example in 5 to 15 seconds, to a temperature at least one degree below the melting temperature and preferably to supercool the melt from 5° to 15° C., or lower. A cover 22 closely fitting the top of the crucible 16 is provided in order to maintain a low thermal gradient above the top of the melt. A second induction heating coil 23 is disposed upon the cover 22 to provide temperature control at point 25 (the meniscus) whereby point 25 is maintained at a predetermined and controlled temperature of from 2° C. to 30° C. cooler than the melt within the crucible 16. This feature will be discussed in more detail hereinafter. Passing through an aperture 24 in the cover 22 is a seed crystal 26 having a plurality of twin planes, preferably three, and oriented crystallographically as will be disclosed in detail hereinafter. The crystal 26 is fastened to a pulling rod 28 by means of a screw 30 or the like. The pulling rod 28 is actuated by suitable mechanism to control its upward movement at a desired uniform rate, ordinarily in excess of one inch per minute. A protective enclosure 32 of glass or other suitable material is disposed about the crucible with a cover 34 closing the top thereof except for an aperture 36 through which the pulling rod 28 passes.

Within the interior of enclosure 32 is provided a suitable protective atmosphere entering through a conduit 40, and, if necessary, a vent 42 may be provided for circulating a current of such protective atmosphere. Depending on the crystal material being processed in the apparatus, the protective atmosphere may comprise a noble gas such as for example helium or argon, or a reducing gas such as hydrogen or mixtures of hydrogen and nitrogen, or nitrogen or the like or mixtures of two or more gases. In some cases, the space around the crucible may be evacuated to a high vacuum in order to produce crystals of materials free from any gases.

Figure 2:
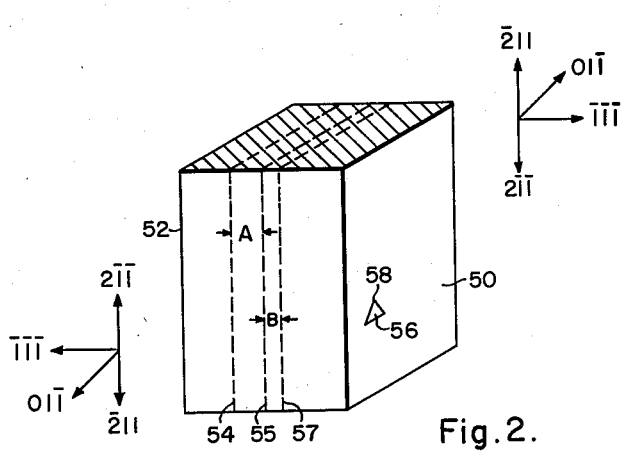
FIG. 2 is a greatly enlarged fragmentary view, in cross section of a dendritic seed crystal.

Referring to FIG. 2 of the drawing, there is illustrated, in greatly enlarged view, a section of a preferred seed crystal 26 having three twin planes. Seed crystals may be obtained in various ways, for example, by supercooling a melt of the solid material to a temperature at which a portion thereof solidifies, at which time some dendritic crystals having a plurality of internal twin planes will be formed and may be removed from the melt. While these crystals may not be uniform, they are suitable for seed purposes. Also, one can cut from a crystal a section suitable for use as a seed crystal.

The seed crystal 26 comprises two relatively flat parallel faces 50 and 52 with intermediate interior twin planes 54, 55 and 57. The faces 50 and 52 have the crystal orientation indicated by the crystallographic direction arrows at the right and left faces respectively of the figure. It will be noted that the horizontal direction perpendicular to the flat faces 50 and 52 and parallel to the melt surfaces is $<111>$. The direction of growth of the dendritic crystal will be in a $<211>$ crystallographic direction. If the faces 50 and 52 of the dendritic crystal 26 were to be etched preferentially to the {111} planes, they will both exhibit equilateral triangle etch pits 56 whose vertices 58 will be pointed upwardly while their bases will be parallel to the surface of the melt. It is an important feature of the preferred embodiment of the present invention that the etch pits of both faces 50 and 52 of seed crystal 26 have their vertices 58 pointed upwardly or in the direction of crystal pulling. The spacings or lamellae between the successive adjacent twin planes ordinarily is not uniform. The lamellar spacing, such as "A" between twin planes 54 and 55, and "B" between twin planes 55 and 57, is of the order of microns, that is from a fraction of a micron to 15 to 20 microns or possibly greater. The ratio of A to B as determined from studies of numerous dendritic crystals has varied in the ratio of slightly more than 1 to as much as 18. Good seed crystals have been found to have lamellar spaces between successive twins of 5 microns and 1⅔ microns, respectively. In all cases all the twin planes in good seed crystals extend entirely through the seed. Where the twin planes terminate internally, the seed crystal behaves as if no such twin plane is present insofar as pulling dendrites therewith from a melt.

It has been further discovered that, due to the microscopically small lamellar distances between twin planes, it is highly difficult to determine whether one or more than one twin plane is present in a dendrite or seed crystal. In a number of cases, using all apparent care, it has appeared that but a single twin plane was present in a given dendrite seed crystal. However, improved techniques have been developed which show clearly that these dendritic crystals contain three or even more closely spaced twin planes. One of these improved techniques comprises scribing a line transverse of the length of the dendrite, bending the dendrite at the scribed line to bow it away from the scribed line until it fractures thereat, and, without polishing or otherwise working on the fractured face, examining it under a microscope at a magnification of at least 100×, and preferably 200× to 500×. The fracturing results in relatively flat faces developing at successive lamellae at different angles to each other which stand out distinctly under illumination. Also, etching of a polished cross section, preferably cross sections lapped at an angle to the flat face, so as to selectively distinguish the lamellae from each other, will enable the separate twin planes to be clearly distinguished.

The most satisfactory crystal growth is obtained by employing seed crystals of the type exhibited in FIG. 2 wherein three twin planes are present interiorly and are continuous across the entire cross section of the seed.

Seed crystals having an odd number (other than 1 and 3, that is, 5, 7 and up to 13 or more) of parallel twin planes containing the growth direction may be employed in practicing the process of this invention, due care being had to point the triangular etch pits on the outer faces of the crystal with their vertices upwardly or in the direction of crystal pulling and the bases parallel to the surface of the melt. Further, seed crystals containing an even number of twin planes may be employed for crystal pulling, though as desirable pulled crystals will not be obtainable as with the preferred three twin plane seed crystal as shown in FIG. 2. Normally, the pulled dendrite will exhibit the same twin plane structure as the seed crystal exhibits. Thus, the dendrite will have three parallel twin planes extending through its entire length, and often extending from edge to edge, if the seed comprises three twin planes.

The direction of withdrawal of the seed crystal 26 having an odd number of twin planes from the melt 18 must be with the direction of the vertices 58 of the etch pits pointed in the direction of pull and the bases being substantially parallel to the surface of the melt. When so withdrawn, the melt will solidify at the bottom of the crystal in a satisfactory prolongation thereof. If crystal 26 were to be inserted into the melt so that the vertices 58 pointed downwardly, very erratic grown crystals will be produced which are not only of non-uniform dimensions but grow at angles of 120° to the seed and produce very irregular spines, and generally are unsatisfactory.

When a relatively cold flat seed crystal has been introduced into the melt which is at a temperature of only a few degrees above the melting point of the material, the melt will dissolve the tip of the seed crystal. However, there will be a meniscus-like contact between the seed crystal and the body of the melt. Such contact should be maintained by keeping the temperature of the melt close to the melting point of the material.

Upon reducing the power input to the heating coil in order to supercool the melt (or reducing the applied heat if other modes of heat application than inductive heating are employed) there will be observed in a period of time of the order of 5 seconds after the heat input is reduced to a crucible of about 2 inches in diameter and length of 2 inches, the supercooling being about 8° C., an initial elongated hexagonal growth or enlargement on the surface of the melt at the tip of the seed crystal. The hexagonal surface growth increases in area so that in approximately 10 seconds after heat input is reduced its area is approximately 3 times that of the cross section of the seed crystal. At this stage, there will be evident spikes growing out of the two opposite hexagonal vertices lying in the plane of the seed. These spikes appear to grow at the rate of approximately two millimeters per second. When the spikes are from two to three millimeters in length the seed crystal pulling mechanism is energized to pull the crystal from the melt at the desired rates. The initiation of pulling is timed to the appearance and growth of the spikes for best results.

After pulling the seed crystal upwardly from the supercooled melt, it will be observed that the flat solid diamond-shaped area portion is attached to the seed crystal and that a downwardly extending dendritic crystal has formed at each end of the elongated diamond area adjacent the spike. Accordingly, two dendritic crystals can be readily pulled from the melt at one time from a single seed crystal. By continued pulling the two dendritic crystals may be extended to any desired length.

If the seed crystal is disposed so that one edge is nearer the thermal center of the melt crucible than is the other edge, it is possible to increase briefly either the pulling rate or the temperature of the melt, and under these variations the dendritic crystal furthest away from the thermal center or in a hotter region will usually stop growing and thereafter only a single dendritic crystal will be attached to and grow from the seed. Also, if the double dendritic crystal attached to the original seed crystal is introduced into the same or another melt slightly above the melting temperature and after supercooling the melt, on pulling the double dendritic crystal from the surface, there will be formed two diamond-shaped area attached to the double dendrites and four dendritic crystals will be pulled— two attached to each of the original dendrites. Thus, in one instance four germanium dendrites each 5 inches in length were pulled from the melt. While more than 4 dendritic crystals can be pulled from a melt, there may arise interference and other factors which will render such growth difficult.

If the seed crystal 26 were to be pulled at a slowly increasing rate just as supercooling of the crucible is being effected by reducing the heat input, so that at the end of about 5 to 10 seconds the full pulling rate is being applied, then only one dendritic crystal will usually be attached to the seed crystal.

The seed crystal need not be flat. It may be of any suitable size or shape as long as its twin planes extend to an exposed end of the seed in contact with the melt and its orientation corresponds to that shown in FIG. 2. Usually a portion of a previously grown dendritic crystal having a plurality of twin planes will be quite satisfactory for use as a seed and ordinarily such will be used as the seed crystal. The pulled dendritic crystal need have no direct relation to the seed crystal as far as size is concerned. The pulled dendritic crystal will have a size and shape depending on the pulling conditions.

In growing satisfactory flat faced dendritic crystals in accordance with the present invention, the melts of the materials may be supercooled as much as 30 to 40° C. below their melting point. In practice, however, supercooling of from 5 to 15° C. has given best results with germanium and indium antimonide, for example. A greater degree of supercooling requires higher rates of crystal withdrawal from the melt as well as requiring more precise control of the speed of pulling. Germanium and indium antimonide dendritic crystals have been satisfactorily pulled at rates of from 4 inches to 12 inches per minute from melts supercooled 5° C. to 15° C. As an example, these crystals have had a highly uniform thickness selected from the range of from 3 to 20 mils and a selected width of from 1 to 4 millimeters. The length of these crystals is limited solely by the pulling apparatus employed. No difficulty has been experienced in pulling crystals of, for example, 7 inches in length in a slightly modified crystal pulling furnace as normally used in the art.

Figure 3:
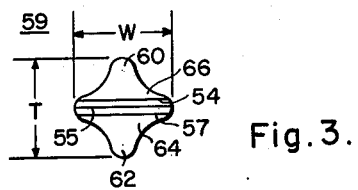
FIGS. 3 to 9 are end views in cross section of dendrites in various stages of growth.

The growth process of the dendrite itself can, for purposes of discussion, be considered as taking place in four steps. However, it should be realized that these four steps blend almost indistinguishably, one into the other and actually occur with great rapidity. The first step is the formation of a core or central region 59 as illustrated in FIG. 3, wherein the seed 26 is viewed in cross section a short distance behind the tip. It can be seen that the core or central region 59 containing the twin planes 54, 55 and 57 is propagated rapidly ahead of other growth and assumes a cruciform structure, with well defined growth regions 60 and 62 perpendicular to the twin planes 54, 55 and 57. In this early stage of growth, the rate of growth of regions 60 and 62, which are perpendicular to the twin planes, may be far greater than the rate of growth of the regions 64 and 66 which are parallel to the twin planes. The regions 60 and 62 substantially determine the thickness T of the final dendrite. During this first step the cruciform structure, which forms the core of the ultimate dendrite, may reach an appreciable fraction of the final thickness of the dendrite while achieving only a small fraction of the final width of the dendrite.

Figure 4:
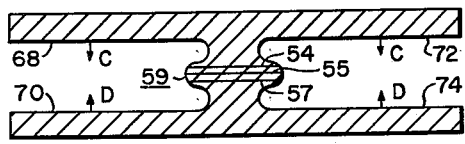
Figure 5:
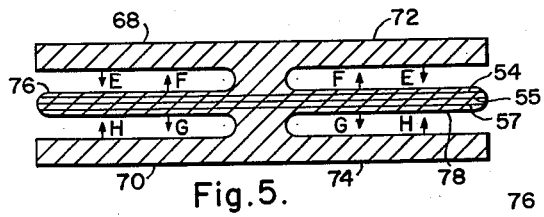

When the growth of regions 60 and 62 perpendicular to the twin planes has progressed to the degree that T is a substantial proportion of the final thickness of the dendrite, well defined growth facets form along the outer edges of the regions 60 and 62 as shown in FIG. 4. These facets are designated as 68, 70, 72 and 74 respectively in FIG. 4. The dendrite now has an H shape cross-sectional configuration with the facets 68, 70, 72 and 74 forming the legs of the H and the core 59 forming the crossbar of the H. The lateral growth of the facets 68, 70, 72 and 74 proceeds rapidly outwardly from the core 59 and is independent of the growth of the core 59. Under some circumstances, which will be discussed hereinafter, the central region containing the twins may grow outwardly faster than the outside arms with the result that a double E, or back-to-back E, structure results such as is illustrated in FIG. 5. The central legs 76 and 78 may grow to substantially the same length as the legs 68, 70, 72 and 74 or they may extend beyond as do legs 176 and 178 in FIG. 6, or in many cases the central legs may be shorter than the legs 68, 70, 72 and 74 and may comprise only a light protuberance from the crossbar or core 59.

Figure 7:
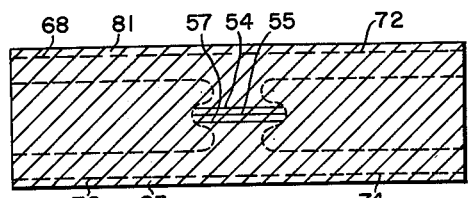
Figure 8:
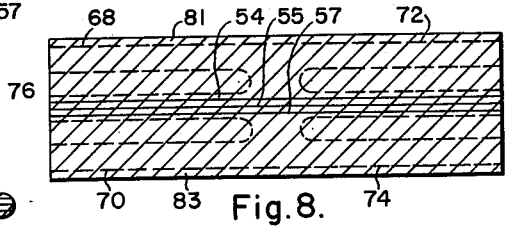

Referring again to FIGS. 3 and 4 during the growth of the legs or facets, step three takes place during which the area between the legs is filled in by material solidifying inwardly from the legs. The growth directions are designated by the arrows C and D in FIG. 4 and E, F, G and H in FIG. 5. The resultant fully grown dendrites are illustrated in FIGS. 7 and 8. FIG. 7 shows one dendrite cross section in which the area between the legs 68, 70, 72 and 74 of FIG. 4 is filled in with solidified material and FIG. 8 shows the areas between the legs 68, 70, 72, 74, 76 and 78 of FIG. 5 filled in with solidified material.

The final step is the addition of layers 81 and 83, as shown in FIGS. 7 and 8, which may vary in thickness from a few microns to a practical limit of 5 mils, to the exterior surfaces of the legs. The growth of the thin layers 81 and 83 takes place to a greater or less degree at the meniscus region (point 25) between the melt and the dendrite depending on the conditions selected.

As illustrated in FIGS. 4 through 8, the legs of the H will generally grow with relatively flat surfaces and the layers 81 and 83 will grow on the flat outer surfaces of the legs. With these flat surfaces the addition of the surface layers is best accomplished by controlling the temperature conditions in the meniscus region.

Figure 9:
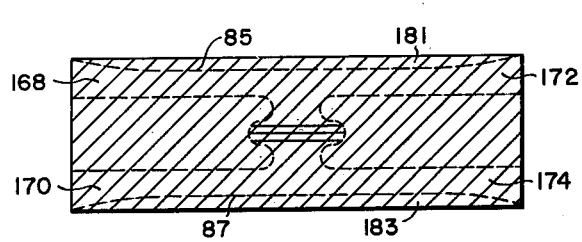

However, and with reference to FIG. 9, under certain growing conditions, namely when the pull rate is low, approximately 1 to 4 inches per minute, and the degree of supercooling of the melt is relatively high, 8° to 10° C., outer surfaces 85 and 87 of legs 168, 170, 172 and 174, may grow with a concave configuration. In such case the growth of the thin layers 181 and 183 on the outer surfaces of the legs is such as to produce a flat outer surface. The addition of thin layers to fill in the concave depressions so formed in the legs is believed to take place under the surface of the melt. Thus controlling the conditions in the meniscus region in this case is relatively less important. It may be desirable for this particular configuration to keep the meniscus region warmer than normal to prevent additional layers from being added there.

The fact that surface layers are added at a different time and by somewhat different mechanisms can be easily shown by metallographic etching techniques. Such etching techniques are particularly informative when used on material containing $10^{17}$ to $10^{19}$ impurity atoms per cubic centimeter of melt. In such cases, etching of cross sections of dendrites in many conventional semiconductor etchants, such as the CP4 etch, will bring out structural differences due to small variations in impurity content. These differences in impurity content show how segregation took place during growth and indirectly show the mechanisms by which the different regions of the dendrite were formed. It is possible by such studies to show that the lateral growth of Ge, Si, and III–V compound dendrites given an elongated H-shape configuration. It has furthermore been possible to show that the regions between the legs of the H freeze later and provide an opportunity for forming regions of different conductivity-type.

The etching studies show, in addition to delineating the regions which can be used to form multizone dendrites as discussed above, that in most cases thin layered growth occurs on top of the laterally extending legs of the H. The etching indicates definitely that these layers are laid down at a different time and in different way than the underlying material in the lateral legs. In one cross section of a Ge dendrite pulled from a melt containing about $5 \times 10^{19}$ arsenic atoms per cm.$^3$ at a pull rate of about 5 in./min., the laterally extending legs were 0.0012 inch thick near the core and 0.0025 inch thick at a distance 0.025 inch out from the core region. This produces a dish-shaped or concave depression in the lateral legs. The etching studies showed that this dish-shaped depression was filled in by a very thin layered growth. This type of growth is illustrated in FIG. 9.

In another dendrite where the basic H-shape configuration was pulled through a very cool meniscus region, the layers which grew over the basic H leg configuration were easily distinguished from the remainder of the dendrite by etching. The fact that this could be shown up by etching indicated that there were differences in concentration and segregation characteristics between these layers and the main body of the dendrite.

The dendritic growth process described in the preceding paragraphs lends itself readily to the production of dendrites having alternate layers of opposite types of semi-conductivity if the doping materials are selected on the basis of their segregation coefficients, that is, the ratio of amount in the solid phase to that in liquid phase, and their respective concentrations in the melt are controlled. The presently accepted equilibrium segregation coefficients in germanium of the most common p- and n-type doping materials are set forth below in tabular form.

TABLE

| Element: | Segregation coefficient in germanium |
|---|---|
| (P-type)— | |
| Boron | 17 |
| Aluminum | .10 |
| Gallium | .10 |
| Indium | .001 |
| Thallium | .00004 |
| (N-type)— | |
| Phosphorus | .12 |
| Arsenic | .04 |
| Antimony | .003 |
| Bismuth | .00004 |

These segregation coefficients are valid only at the melting point of geranium and under conditions of normal equilibrium solidification. It has been found that the segregation coefficient usually will be vastly different in dendritic growth. However, as a first approximation for selecting pairs of doping materials for producing alternate layers of opposite types of semiconductivity in dendrites, it can be assumed that the relative order will be the same for dendritic growth as for conventional crystal growth (about 0.001 per inch per second).

The process for achieving three, five, or more zone dendrites from the melt requires doping with at least two impurities, an n-type and a p-type, one of which segregates more readily than the other while maintaining certain temperature relationships between the melt and the meniscus.

If a dendrite is pulled from apparatus of the type shown in FIG. 1 and the crucible 16 does not have a cover, or the cover if present, is not heated, the temperature at point 25 will vary widely and the thickness of the flat layers grown on the H legs will vary and be relatively uncontrollable. When the temperature at point 25, the meniscus, is controlled by heating the crucible cover, the thickness of the layer deposited on the H legs can be controlled. The impurity which does not tend to segregate in the liquid phase as readily as the other impurity, will come down predominately in the core and outwardly growing legs. The impurity which is segregated most easily in the liquid phase will concentrate in the liquid melt, be the last to solidify and consequently will solidify in the areas between the legs. If the impurity which is segregated most easily in the melt is present in greater quantities than the other impurity, for example present in a ratio about at least 1.5 to 1, and the temperature at the meniscous is 10° C. to 20° C. cooler than the body of the melt, this impurity will also predominate in the thin layers deposited on the H legs. The same situation will prevail if the concave H legs are formed, such formations not requiring special meniscus temperature control.

Figure 10:
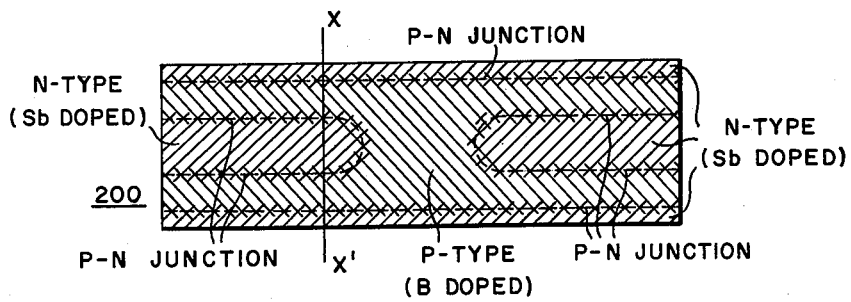
FIGS. 10 to 13 are end views in cross section of dendrites prepared in accordance with the teachings of this invention.
Figure 11:
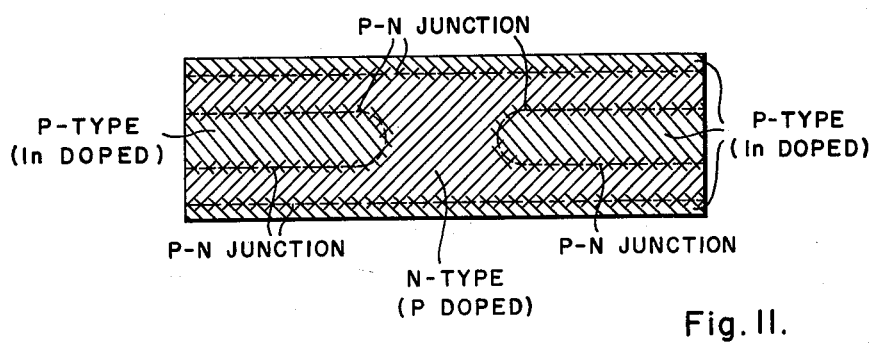

From the table, it can be seen that doping with boron, as the p-type impurity and antimony, as the n-type impurity in predetemined amounts, gives a good combination of doping impurities. The antimony is segregated in the liquid phase much more readily than the boron. The resultant structure would have a p-type core and legs, an n-type area between the legs and thin n-type layers disposed on the side of the legs away from the core. Such a structure is illustrated in FIG. 10. To obtain the reverse conductivity configuration, a good combination is indium as the p-type impurity, and phosphorus as the n-type impurity. Indium segregates more readily in the liquid phase than does phosphorous, thus with proper adjustment in concentrations, the core and leg regions will be doped n-type by a predominance of phosphorus, and the areas between the legs and the thin flat layers grown on the legs will be doped p-type by a predominance of the indium. Such a structure is illustrated in FIG. 11.

In one type of application of this invention the concentration of the respective doping materials in the melt, which should be at least $10^{13}$ atoms/cc. of melt and will usually range from $10^{13}$ to $10^{20}$ atoms/cc., must be determined independently for each system and in addition to being dependent on the respective materials involved is dependent to a degree on the degree of supercooling of the melt and for certain configurations on the temperature at the meniscus and the pull rate of the dendrite. Generally, the doping materials are added in a ratio of somewhat greater than 1 to 1 possibly as great as 3:1 for certain systems, the material doping the area between the legs and the thin layers being present in greater amount, then altered if necessary to produce a dendrite of desired carrier concentration and dendrite configuration. For example, to pull a five zone NPNPN dendrite of the type illustrated in FIG. 10 from a germanium melt supercooled at 10° C., and the meniscus being 10° C. cooler than the melt, at a pull rate of 7 inches per minute, a melt doped to a concentration of about $5 \times 10^{14}$ atoms/cc. of boron and $8 \times 10^{14}$ atoms/cc. of antimony per 100 grams of germanium will be satisfactory. To pull a five zone PNPNP dendrite of the type illustrated in FIG. 10 from a germanium melt supercooled 8.5° C. and the meniscus being 5° C. to 10° C. cooler than the melt, at a pull rate of 6 inches per minute, a melt doped to a concentration of about $1 \times 10^{16}$ atoms/cc. of phosphorus and about $4 \times 10^{17}$ atoms/cc. of indium will be satisfactory. N-type layers can be produced on top of the H legs if they form with a concave surface (as shown in FIG. 9) away from the meniscus region and without special manipulation thereof.

Figure 6:
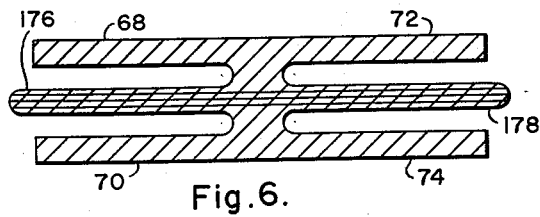
Figure 12:
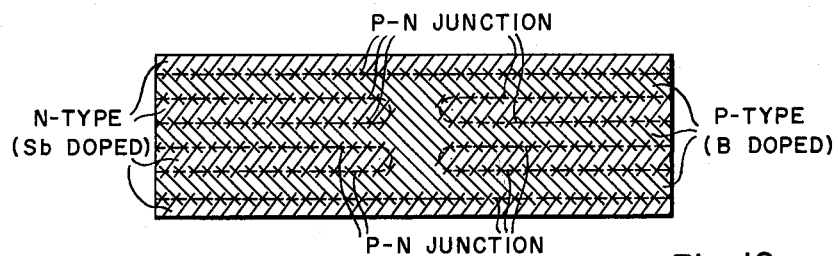

When the concentration of doping material in the melt is relatively high (especially that of the material with the larger segregation coefficient to predominate in the core and legs) and the pull rate is low, for example 2 to 4 inches per minute, the dendrite has a tendency to begin to grow in the double E configuration illustrated in FIG. 5 or 6 and the complete dendrite is of the type illustrated in FIG. 12. If the dendrite of FIG. 12 was grown from a melt doped with boron and antimony in the correct proportion and with the meniscus temperature cooler than the melt, it will have the seven region configuration shown in FIG. 12.

Figure 13:
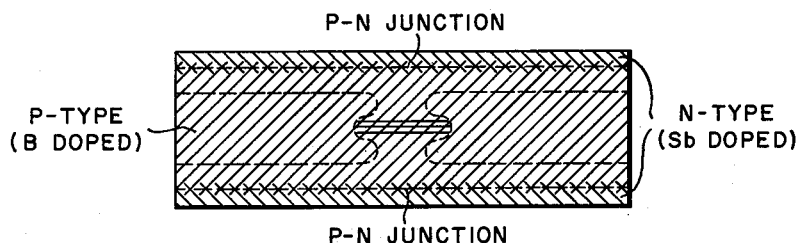

In addition to the five and seven region configurations shown and discussed hereinabove, it is also possible to produce dendrites having three regions, as illustrated in FIG. 13, wherein the core, legs, and areas between the legs are all of one type of semiconductivity and the thin layers deposited on the outer surfaces of the legs are of a second type of semiconductivity. Such a configuration results when the dendrite is pulled from a melt comprised of a semiconductor material, for example, germanium doped with a p- and an n-type impurity having about the same effective segregation coefficient. Selecting indium and antimony, for example, in an atomic ratio of about 3 parts indium to 1 part antimony using a pull rate of about 6 inches per minute, and cooling the meniscus from 5°–20° C. below the melt temperature, a suitably doped dendrite can be produced containing a body of p-type semiconductivity covered with a thin layer on both sides of n-type conductivity. This configuration is obtained because the layers added are very thin, thus permitting more effective segregation of indium into the melt.

In a variation of this technique, thin p-type layers can be grown on either a body which is wholly n-type or onto a dendritic body which has n-type H legs and p-type regions elsewhere by using, for example, a melt containing phosphorus and aluminum in an atomic ratio of about 1.5 to 1. Since phosphorus volatilizes relatively easily from the surface regions of the melt, the concentration of phosphorus will be particularly depleted by evaporation in the meniscus region 25. Therefore in this region the aluminum will predominate to give a thin layer of p-type material on top of the H legs which are n-type.

In addition to the actual doping materials certain relatively neutral metals, for example, tin, may be added to the melt to aid the doping materials to go into solution with the germanium or other semiconductor material.

The three, five and seven zone dendrites grown in accordance with the teachings of this invention can be readily fabricated into multiregion semiconductor devices. For example, if a section of the dendrite of FIG. 10 was cut, etched or otherwise broken along the line XX', the left-hand section 200 would be comprised of five zones of alternate semiconductivity, namely, NPNPN.

Figure 14:
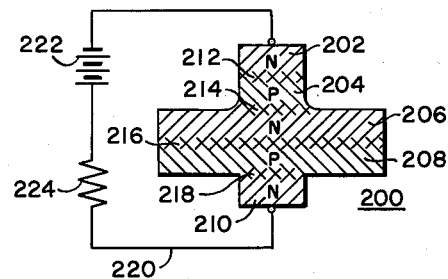
FIG. 14 is a schematic diagram of an electrical circuit employing a semiconductor device prepared in accordance with this device.

With reference to FIG. 14 there is illustrated a device fabricated from the section 200 of FIG. 10. The section 200 of the dendrite is comprised of a first n-type region 202, a first p-type region 204, a second n-type region 206, a second p-type region 208, and a third n-type region 210. There is a p-n junction 212 between regions 202 and 204, a p-n junction 214 between regions 204 and 206, a p-n junction 216 between regions 206 and 208, and a p-n junction 218 between regions 208 and 210. Portions of regions 202, 204 and 210 have been etched away to expose p-n junctions 212, 214 and 218 to light. When the semiconductor device is connected in series by a conductor 220 with a direct current power source 222 and a low resistance 224, this system, which is described in detail in U.S. patent application Serial No. 4,398, filed January 25, 1960, and which is assigned to the same assignee as the present invention, will generate a triangular pulse having a first frequency when the device is in darkness and at a second frequency when the device, especially p-n junction 212 is struck by light of a given intensity.

The following example is illustrative of the teachings of this invention.

*Example I*

In apparatus similar to that illustrated in FIG. 1, a melt containing a quantity of germanium and $9.88 \times 10^{16}$ atoms/cc. of tin, about $5.86 \times 10^{14}$ atoms/cc. of boron and about $8.34 \times 10^{14}$ atoms/cc. of antimony per 100 grams of germanium was prepared in a graphite crucible. The tin is added in the form of a tin-germanium alloy comprised of 0.36% tin by weight. The boron is added in the form of a boron-germanium alloy containing $3.89 \times 10^{-2}\%$ boron by weight. The antimony is added in the form of an antimony-germanium alloy containing 0.16% by weight antimony. The melt was heated by the induction coil to a temperature several degrees above the melting point of the melt. A dendritic seed crystal having three twin planes and oriented as illustrated in FIG. 2 of the drawings is held vertically in a holder until its lower end touches the surface of the melt. The contact between the melt and the seed is maintained until a small portion of the end of the dendritic seed crystal has melted. Thereafter, the temperature of the melt is lowered rapidly in a matter of five seconds, by reducing current to the coil 20, to a temperature 10° C. below the melting point of the melt so that the melt is supercooled. After an interval of approximately 10 seconds at this temperature, the germanium seed crystal is pulled upwardly at a rate of 7 inches per minute. The heat input to the top of the melt 18 and the radiation therefrom is adjusted by means of lid 22 and by energizing coil 23 to give a temperature at the meniscus 25 which is about 10° C. cooler than the body of the melt.

The dendrite thus grown had the same NPNPN cross section as that illustrated in FIG. 10.

Generally, the three and five region suitably doped dendritic crystals prepared in accordance with the teaching of this invention will have a thickness of the order of from 1 to 25 mils and the width across the flat face may be from 20 mils to 200 mils and even wider. The surface of the flat faces will exhibit essentially perfect (111) orientation. Properly grown crystals will have faces that are parallel and planar within a wave length of sodium light, per centimeter of length.

While the dendritic crystals may exhibit some degree of edge serration, dendritic crystals have been obtained with usably uniform edges having a minimum of ragged appearance. The serrated edges comprise only a small portion of the crystals and can be readily removed or left intact in dice since they do not affect the properties of essential or main body portion of the dendrites.

It has been discovered that the flat doped dendritic crystals of the present invention are relatively flexible, and crystals of a thickness of 7 mils may be bent on a radius on the order of 4 inches or even less without breaking. Consequently, crystals may be continuously drawn from the melt and wound on a cylinder of a radius of this order in continuous lengths, as desired. The thinner crystals obviously can be wound to a smaller radius than crystals of greater thickness.

While the invention has been described with reference to a particular embodiment and examples, it will be understood that modification, substitutions and the like may be made without departing from its scope.

We claim as our invention:

1. A dendrite of semiconductor material which exhibits areas of different types of semiconductivity in a transverse cross section of the dendrite, comprising an elongated body having two substantially parallel flat faces of {111} orientation extending in the lengthwise direction, the dendrite having two substantially symmetrical portions disposed about a plane perpendicular to the faces and extending midway of the edges along the lengthwise direction of the dendrite, each symmetrical portion comprising, (1) at least two legs extending substantially perpendicularly from said plane, (2) a central crossbar connecting the legs at the said plane, the legs and the crossbar being of one type of semiconductivity, (3) at least one area between the legs extending laterally from the crossbar to the outside edge, and (4) a flat layer grown on the outside of each of the two outermost legs, the layers being of an opposite type of semiconductivity than that of the legs.

2. A dendrite of semiconductor material which exhibits areas of different types of semiconductivity in a transverse cross section of the dendrite, comprising an elongated body having two substantially parallel flat faces of {111} orientation extending in the lengthwise direction, the dendrite having two substantially symmetrical portions disposed about a plane perpendicular to the faces and extending midway of the edges along the lengthwise direction of the dendrite, each symmetrical portion comprising (1) two outer legs extending from said plane, (2) a central crossbar connecting the legs at the said plane, the legs and the cross-bar being of one type of semiconductivity, (3) an area between the legs extending laterally from the crossbar to the outside edge, said area being of an opposite type of semiconductivity, and (4) a flat layer grown on the outside of each of the two outer legs, the layers being of an opposite type of semiconductivity than the legs.

3. A dendrite of a semiconductor material which exhibits areas of different types of semiconductivity in a transverse cross section of the dendrite, comprising an elongated body having two substantially parallel flat faces of {111} orientation, the dendrite having an H-shaped cross-sectional portion, the legs and crossbar of the H-shaped portion being of one type of semiconductivity, two longitudinally extending areas between the legs on opposite sides of the crossbar being of the opposite type of semiconductivity and a flat layer grown on the outside of each leg and being of an opposite semiconductivity than the legs.

4. A dendrite of semiconductor material which exhibits areas of different types of semiconductivity in a transverse cross section of the dendrite, comprising an elongated body having two substantially parallel flat faces of {111} orientation extending in the lengthwise direction, the dendrite having two substantially symmetrical portions about a plane perpendicular to the faces and extending midway of the edges along the lengthwise direction, each symmetrical portion having an E-shaped configuration of one type of semiconductivity, there being two areas between the legs of each E-shaped configuration of the opposite type of semiconductivity, and a flat layer grown on the outside of the two outermost legs, said flat layers being of an opposite type of semiconductivity than the legs.

5. A dendrite of semiconductor material comprising an elongated body having two substantially parallel flat faces of {111} orientation extending in the lengthwise direction of the dendrite, the dendrite having two substantially symmetrical portions disposed about a reference plane perpendicular to the faces and extending substantially midway of the edges along the lengthwise direction of the dendrite, a central core being present around said reference plane, said core having at least one group of twin planes perpendicular to said reference plane disposed therethrough, each group of twin planes being comprised of at least two twin planes, each symmetrical portion of the dendrite disposed on opposite sides of the core being comprised of at least two legs for each group of twin planes, each leg being substantially perpendicular to said reference plane and extending from the core, an area between successive legs, each of said areas extending from the core to the edge of the dendrite, and a flat layer grown on the outside of the outermost legs, said core and legs being of one type of semiconductivity and the flat layers and the areas between the legs being of an opposite type of semiconductivity.

6. A dendrite of semiconductor material comprising an elongated body having two substantially parallel flat faces of {111} orientation extending in the lengthwise direction of the dendrite, the dendrite having two substantially symmetrical portions disposed about a reference plane perpendicular to the faces and extending substantially midway of the edges along the lengthwise direction of the dendrite, a core of the dendrite being present around the reference plane, said core having at least one group of twin planes disposed therethrough in the <211> direction, each group of twin planes being comprised of at least two twin planes, and each group of twin planes being spaced from adjacent groups by at least 1 mil, each symmetrical portion of the dendrite disposed on opposite sides of the core being comprised of at least two legs extending from each group of twin planes, each leg being substantially perpendicular to the said reference plane and extending out from the core, and an area between adjacent legs, each of said areas extending from the core to the edge of the dendrite, and a flat layer comprising the flat face of {111} orientation of the dendrite grown on the outside surfaces of the two outermost legs, said core and legs being of one type of semiconductivity and the flat layers and the areas between the legs being of an opposite type of semiconductivity.

References Cited in the file of this patent

UNITED STATES PATENTS

| | | |
|---|---|---|
| 2,754,431 | Johnson | July 10, 1956 |
| 2,813,048 | Pfann | Nov. 12, 1957 |
| 2,879,189 | Shockley | Mar. 24, 1959 |
| 2,928,761 | Gremmelmaier | Mar. 15, 1960 |
| 2,929,753 | Noyce | Mar. 22, 1960 |
| 2,935,478 | Bradshaw | May 3, 1960 |
| 2,937,114 | Shockley | May 17, 1960 |
| 2,954,307 | Shockley | Sept. 27, 1960 |

OTHER REFERENCES

Billing: Acta Cryst. (1955), vol. 8, pages 353–354.

Proceedings of the Royal Society, A Vol. 229, pages 346–363.

Canadian Journal of Physics, vol. 34, pages 234–240 (1956).

Acta Metallurgica, vol. 5, No. 1, 1957, pages 53 and 54.

Liquid Metals and Solidification, American Society for Metals, Cleveland, Ohio, 1958. Relied on pages 334 and 335.

Bennett and Longini: The Physical Review, vol. 116, No. 1, pages 53–61, October 1, 1959.